United States Patent [19]

Isogawa

[11] Patent Number: 5,735,614
[45] Date of Patent: Apr. 7, 1998

[54] OUTBOARD MOTOR

[75] Inventor: Atsushi Isogawa, Hamamatsu, Japan

[73] Assignee: Sanshin Kogyo Kabushiki Kaisha, Hamamatsu, Japan

[21] Appl. No.: 704,141

[22] Filed: Aug. 28, 1996

[30] Foreign Application Priority Data

Aug. 31, 1995 [JP] Japan ............... 7-224174

[51] Int. Cl.$^6$ .............................. F16C 33/46
[52] U.S. Cl. ............... 384/476; 384/527; 384/572; 384/625; 384/912
[58] Field of Search ............ 384/573, 576, 384/575, 572, 527, 476, 277, 625, 912

[56] References Cited

U.S. PATENT DOCUMENTS

| | | | |
|---|---|---|---|
| 4,452,539 | 6/1984 | Evans et al. | 384/94 |
| 4,896,367 | 1/1990 | Newton et al. | 384/9 |
| 5,104,241 | 4/1992 | Seifert et al. | 384/573 |
| 5,200,265 | 4/1993 | Seifert et al. | 384/573 |

*Primary Examiner*—Lenard A. Footland
*Attorney, Agent, or Firm*—Knobbe, Martens, Olson & Bear LLP

[57] ABSTRACT

A crankshaft bearing arrangement for a two cycle crankcase compression internal combustion engine that provides a low frictional resistance and corrosion resistant. Electro galvanic corrosion is precluded by the utilization of an electrical insulating substance and by minimizing the electrical potential differences between the materials of the bearing.

4 Claims, 4 Drawing Sheets

OUTBOARD MOTOR

BACKGROUND OF THE INVENTION

This invention relates to an outboard motor and more particularly to a bearing arrangement for utilization in outboard motors or other similar applications for engines operating on a two-stroke crankcase compression principle.

As is well-known, crankcase compression two cycle engines are generally employed as the power plant in outboard motors. This type of engine has a number of advantages over the four cycle engine, primarily in simplicity. However, because of the fact that the two cycle engine is lubricated by a lubricant which is either mixed with the fuel or which passes through the induction and combustion chambers of the engine, it presents different types of problems from four cycle engines.

In order to improve the journaling of various components such as the connecting rod on the crankshaft and/or the crankshaft in the cylinder block, there are utilized antifriction bearings that include rollers, balls or needles, collectively referred to herein as "rollers", contained within a cage. This type of bearing has particular utility with two cycle engines because of its improved frictional resistance while requiring a minimum degree of lubrication, under at least some circumstances. Generally the bearing is comprised of a bearing holder or cage in which the individual bearing roller members are positioned. The bearing members are normally formed from a harder material than the holder because they are the members that experience the most wear. Frequently, the cage or holder for these bearing members is formed from a light weight stamped material.

In order to provide good bearing surfaces and long life, the holder is frequently provided with a plated coating. Copper on the base metal with silver plating on the copper is frequently employed. A disadvantage with this type of construction, however, is that there is electrical corrosion caused by the different electric potential of the bearing and holder materials. That is, there is a difference in the electrochemical characteristics of the materials which can give rise to potential electro-chemical corrosion problems.

These problems are particularly prevalent in outboard motor applications because the inducted air may contain a fairly high amount of water in the form of vapor. When operating in marine environments, salt water must be contended with and this further aggravates the problems of electro galvanic corrosion. Also outboard motors are operated many times on fuels that have low lubricity in themselves, such as kerosene. Thus, further problems can be encountered in such applications.

It is, therefore, a principal object of this invention to provide an improved bearing arranged for a two cycle, crankcase compression engine.

It is a further object to this invention to provide an improved anti-friction bearing arrangement for the crankcase of a two cycle engine.

It is a further object of this invention to provide an improved connecting rod bearing for such engines.

SUMMARY OF THE INVENTION

In accordance with the features of the invention, a connecting rod journal is provided for a two cycle crankcase compression engine for supporting the end of a connecting rod on a crankshaft throw. The bearing includes a cage having a plurality of roller members that are interposed between the connecting rod and the crankshaft throw.

In accordance with a first feature of the invention, at least one of the engaging surfaces as is coated with an electrical insulating substance.

In accordance with another feature of the invention, the bearing holder and the rollers contained by it are formed from materials such that of the holder has a n electrical potential no greater than that of the bearing members.

DETAILED DESCRIPTION OF THE PREFERRED EMBODIMENTS OF THE INVENTION

Figure 1:
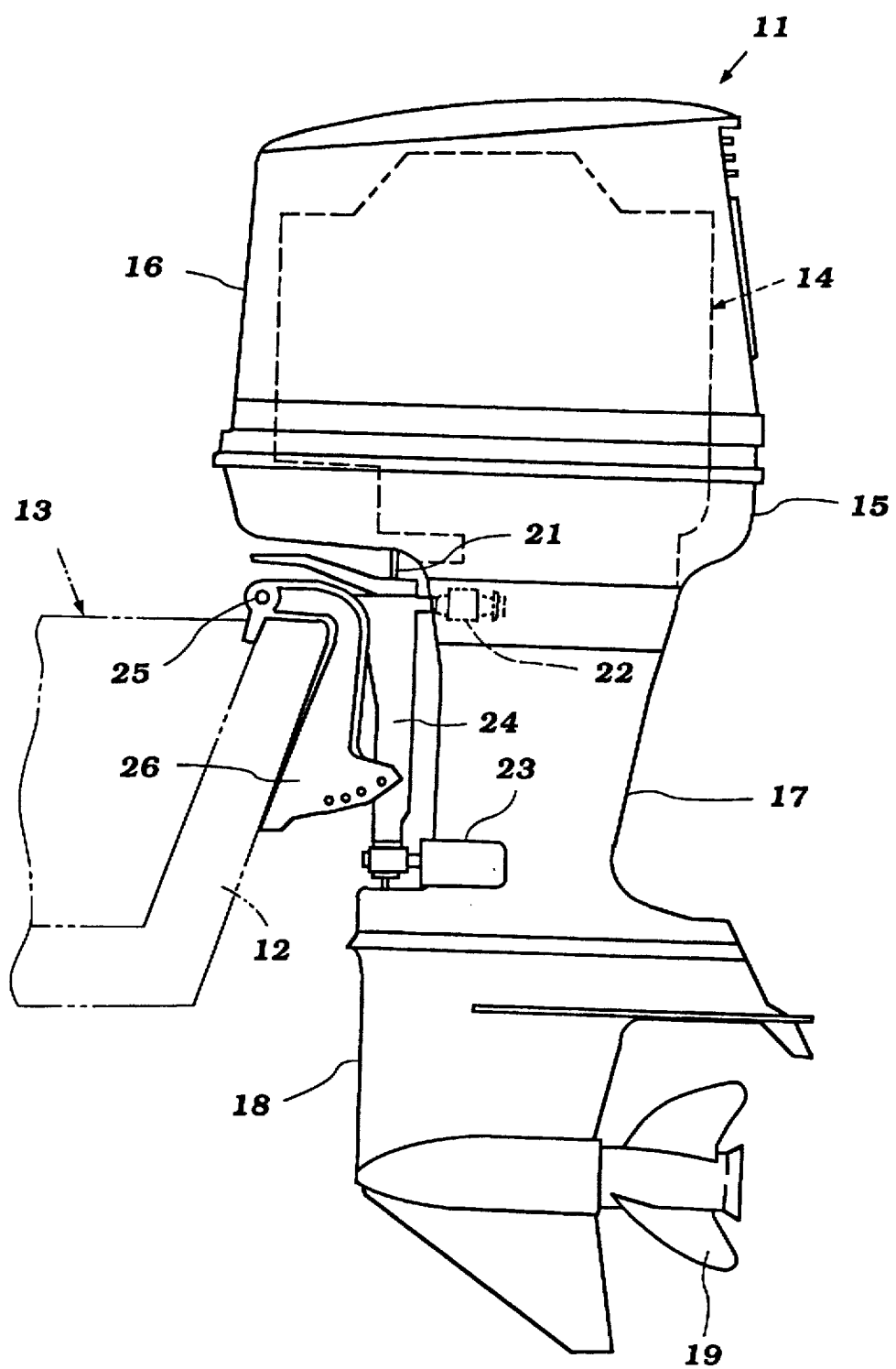
FIG. 1 is a side elevational view of an outboard motor constructed in accordance with an embodiment of the invention and attached to the transom of an associated watercraft, shown partially and in phantom.

Referring now in detail to the drawings and initially to FIG. 1, an outboard motor constructed in accordance with an embodiment of the invention is indicated generally by the referenced numeral 11. The outboard motor 11 is depicted as being attached to the transom 12 of an associated watercraft 13 which watercraft is shown in phantom.

The invention is described in section with an outboard motor because, as has been noted, such outboard motors frequently employ two cycle crankcase compression engines as their power plants. This invention has particular utility in conjunction with the bearing arrangement for such engines. Therefore, the outboard motor 11 illustrated is typical of the environment in which the invention may be utilized.

The outboard motor 11 is comprised of a power head that is comprised of a powering internal combustion engine, indicated generally by the reference numeral 14 and which is surrounded by a protective cowling comprised of a lower tray position 15 of and an upper main cowling portion 16. As is typical with outboard motor practice, the tray portion 15 may be formed from a light weight, high strength material such as aluminum or aluminum alloy. The main cowling portion 16, which is detachably connected to the tray 15, is formed from an even lighter weight material, such as a molded fiberglass reinforced resin or the like.

The engine 14 is mounted in the power head as aforedescribed so that its crankshaft rotates about a vertically extending axis. This is done so as to facilitate connection to a drive shaft which is generally within a drive shaft housing 17. The drive shaft housing 17 depends from the power head and terminates in lower unit 18. The aforenoted drive shaft, which is not shown in FIG. 1, is drivingly coupled to a forward/neutral/reverse transmission in the lower unit 18 for selectively driving a propeller 19 in forward or reverse directions.

A steering shaft, shown partially and identified by the reference numeral 21, is connected to the drive shaft housing 17 by an upper bracket assembly 22 and lower bracket assembly 23. This steering shaft 21 is, in turn, journalled within a swivel bracket 24 for steering of the outboard motor 11 about a vertically extending axis.

The swivel bracket 24 is, in ram, pivotally connected by means of a pivot pin 25 to a clamping bracket 26. This pivotal connection permits tilt and trim movement of the outboard motor 11 as is well-known in this art.

The construction of the outboard motor 11 as thus far described may be considered to be conventional. Since the invention deals, as his been noted, with the engine 14 and specifically the bearing arrangement therefor, further description of the outboard motor 11 and specifically the conventional portions thereof are not believed to be necessary to permit those skilled in the art to practice the invention. Therefore, where any details of the outboard motor 11 or of the engine 14, for that matter, are omitted, any conventional structure or known structure may be employed.

Figure 2:
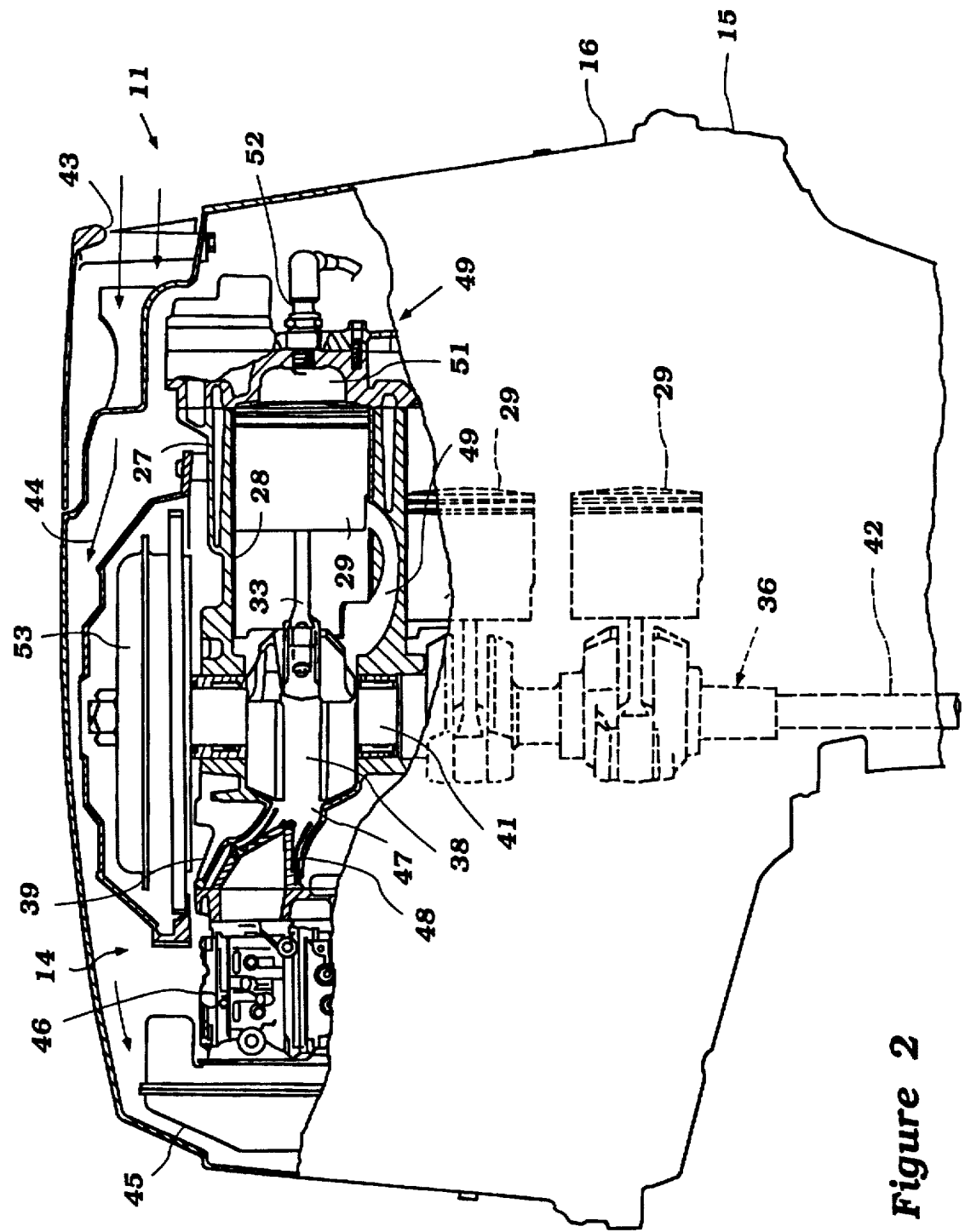
FIG. 2 is an enlarged side elevational view of the power head of the outboard motor with a portion broken away to show more clearly the details of the engine construction.
Figure 3:
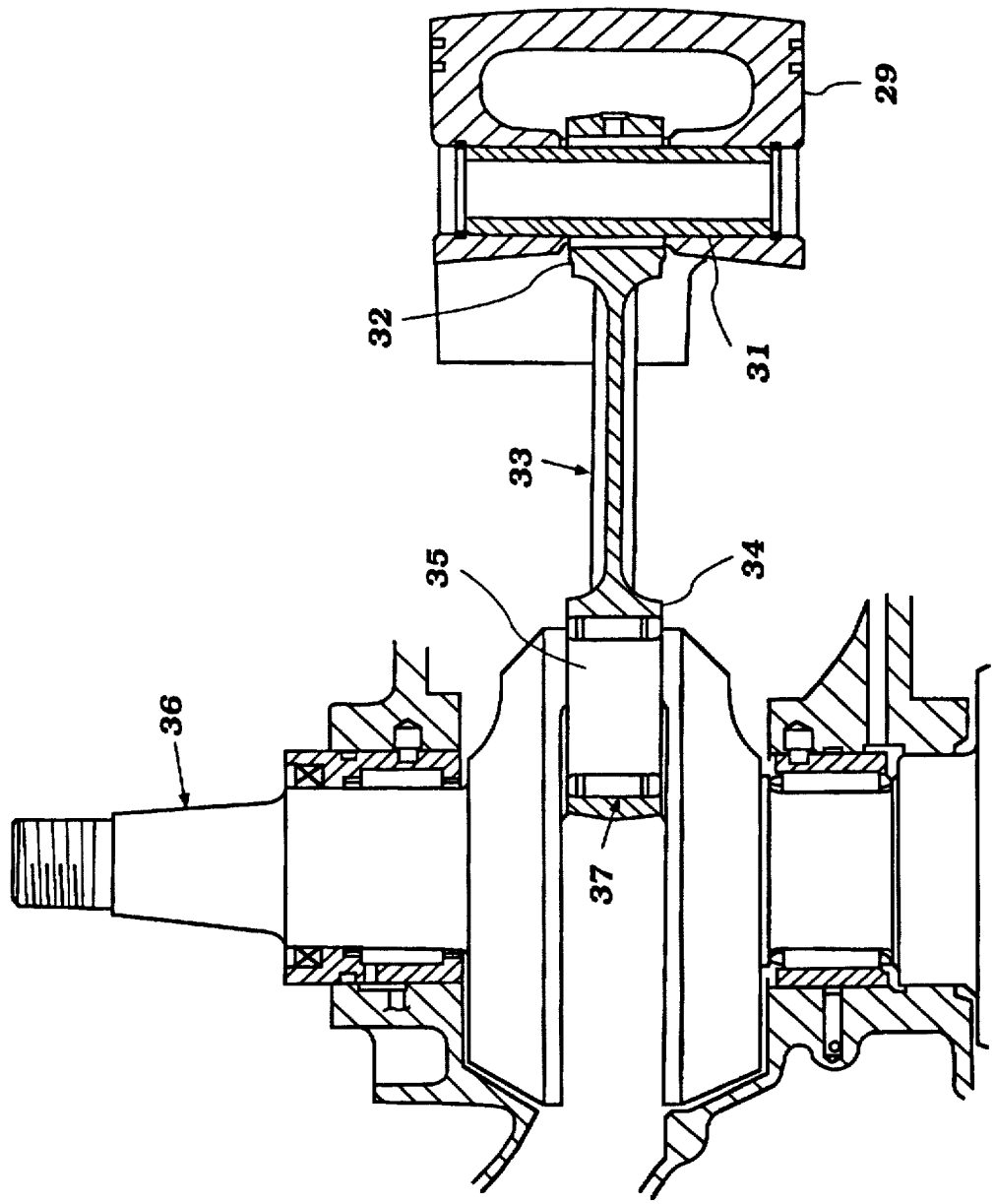
FIG. 3 is a further enlarged cross-sectional view showing the piston connecting rod and journal of the connection rod on the crankshaft of the engine.

Referring now into more detail to FIG. 2, further portions of the engine 14 will be described. The engine 14 in the illustrated embodiment is of the three cylinder, in-line type which operates, as aforenoted, on a two cycle, crankcase compression principle. Therefore, the engine 14 is provided with a cylinder block 27 which is formed preferably from a lightweight material such as aluminum or aluminum alloy casting. Three horizontally extending, vertically spaced, cylinder bores 28 are formed by the cylinder block 27. The cylinder bores 28 may be formed in any suitable manner and a thin walled sleeve type construction is depicted. Those skilled in the art, will, however, readily understand how the invention may be practiced with various other ways in which cylinder bores are normally formed in such lightweight blocks.

Pistons 29 are slidably supported within the cylinder bores 28. As may be best seen in FIG. 2, the pistons 29 are connected by means of piston pins 31 to the upper or small ends 32 of connecting rods 33. The connecting rods 33 have big ends 34 that are journalled on throws 35 of a crankshaft, indicated generally by the reference numeral 36, by bearing assemblies, indicated generally by the reference numeral 37. These bearing assemblies have a construction which will be described in more detail later by reference to FIGS. 4 and 5.

Continuing to refer to the general construction of the engine 14 by primary reference to FIG. 2, it will be seen that the crankshaft 36 is rotatably journalled within a crankcase chamber 38 which is formed by the skirt of the cylinder block 27 and a crankcase member 39 which is affixed thereto in a known manner. The crankshaft 38 has main bearing portions 41 which are journalled by bearings of a type similar to those bearings 37 of the connecting rod journals and rotates about a vertically extending axis as aforenoted. This facilitates the connection to the drive shaft which does appear in FIG. 2 and which is indicated by the reference numeral 42.

As is typical with two cycle crankcase compression engines, the crankcase chamber 38 is divided into a plurality of sections each associated with a respective one of the cylinder bores 28. These sections are sealed from each other in a known manner. An intake charge of fuel and air is delivered to these individual crankcase chambers 38 by an induction system which will now be described.

This induction system includes an atmospheric air inlet opening 43 that is formed in the rearward portion of the main cowling member 36. As a result, atmospheric air may flow into the protective cowling in the direction indicated by the arrows 44.

This air is delivered to an air inlet device and silencer 45 that is mounted suitably on the crankcase end of the engine.

This inlet device 45 delivers air to charge formers such as carburetors 46, one for each cylinder bore 28 and associated crankcase chamber. The carburetors 46 form a fuel air charge which is delivered to intake ports 47 formed in the crankcase member 39 and each of which communicates with a portion of the crankcase chamber 38 associated with the respective cylinder bore 28.

Reed type check valves 48 are provided in each of the intake passages 47. These check valves 48, as is known in the art, permit the fuel air charge to enter the crankcase chamber 38 when the pistons 29 are moving upwardly in the cylinder bores 28. As the pistons 29 move downwardly, this charge is compressed and the read type check valves 48 will close so as to preclude reverse flow.

The thus compressed charge is transferred to the area above the pistons 29 through one or more scavenge passages 49 that are formed in the cylinder block 27. These scavenge passages terminate in scavenge ports that are opened and closed by the reciprocatory movement oft he pistons 29.

A cylinder head assembly, indicated generally by the reference numeral 49, is affixed to the cylinder block 28 and closes the upper ends of the cylinder bores 28. This cylinder head assembly 49 is formed with individual recesses 51, which form the major portion of the clearance volume of the engine at top dead center, as seen by the condition of the uppermost piston 29 in its cylinder bore 28.

Spark plugs 52 are mounted in the cylinder head assembly 49 and have their gaps extending into these recesses 51. The spark plugs 52 are fired by a suitable ignition system which may include a flywheel magneto assembly 53 that is fixed to the upper end of the crankshaft 46 in a known manner. Firing of the spark plugs 52 ignites the charge in the combustion chambers and drives the pistons 29 downwardly. At an appropriate position in the stroke of the piston 29, exhaust ports (not shown) are open so as to permit the exhaust gasses to exit the cylinder bores 28 to the atmosphere through a suitable exhaust system.

Like the construction oft he outboard motor 11, the details of the engine 14 which have been described, except for the bearing assemblies 37 and their cooperation with the connecting rods 33 and crankshaft throw 35 may be considered to be conventional. Therefore, the foregoing description is made to permit those skilled in the art to understand the environment in which the invention is utilized. Where any details of the engine 14 have not been illustrated or described, reference may be had to any known construction for the environment in which the invention may be practiced.

Figure 4:
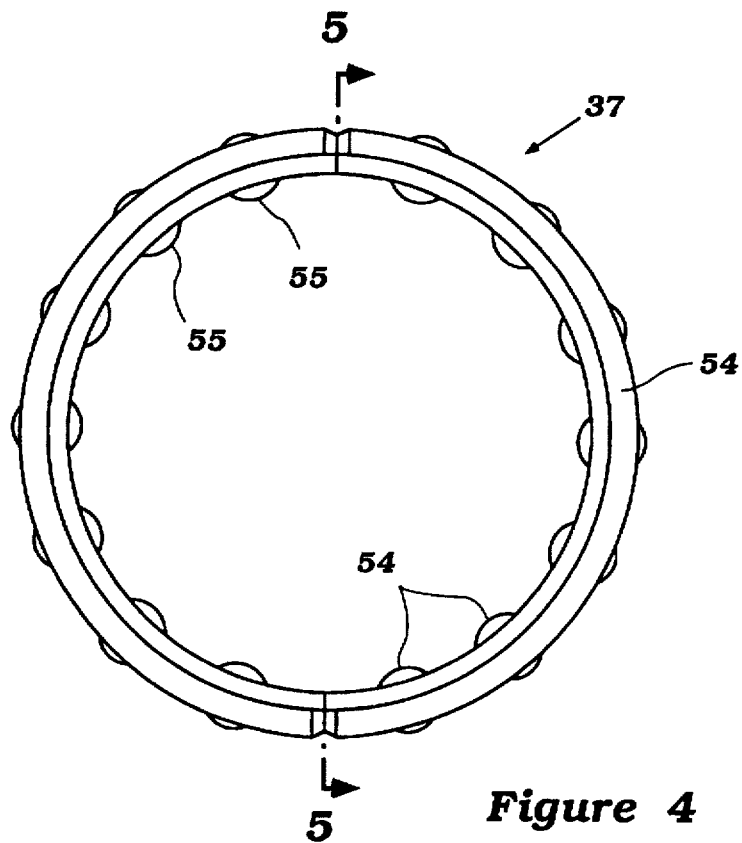
FIG. 4 is an enlarged elevational view of one of the connecting rod bearing assemblies.
Figure 5:
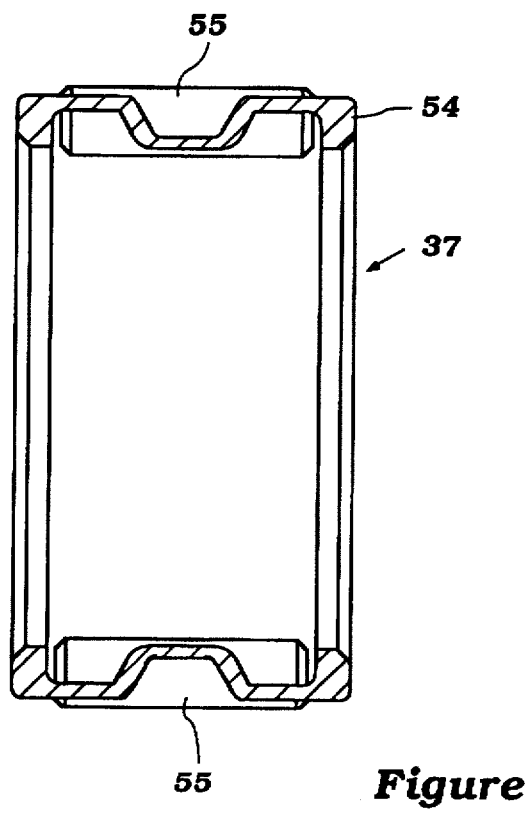
FIG. 5 is a cross-sectional view taken along the line 5—5 or FIG. 4.

The bearing arrangement will now be described referring primarily to FIGS. 4 and 5 wherein the connecting rod bearing assemblies 37 are shown. These connecting rod bearings 37 are formed by caging members or outer housings indicated by the reference numeral 54. They have a configuration as best seen in FIG. 5 so as to permit them to cage and contain roller bearings 55. The roller bearings 55 are held in spaced relationship by the caging member 54 and may rotate relative to it, as is well known in this art. The actual configuration of the caging member 54 and the roller bearings 55 may be of any type known in this art.

However, in accordance with the invention, the caging member 54 is formed from a material which has an electric potential on the electro-chemical table which is of any type and preferably the same as that of the material of the roller bearings 55. Preferably, the roller bearings 55 are formed as a high carbon chrome bearing steel such as those represented by Japanese standard SUJ2. The material of the caging member 54 is a material such as a nickel chrome molidinum steel of the type by identified Japanese standard SNCM420.

In addition, the caging member 54 is preferably plated with another metal that has an electric potential lower than that of the bearings 55. Such a material may be comprised of tin or zinc. In this way, electrical corrosion will be substantially avoided, particularly in adverse situations where the engine 13 is run on a fuel such as kerosene and wherein low amounts of lubricant may be supplied. Also, this avoids attack by any water and particularly salt bearing water was may occur as when operating in marine environments.

In order to further reduce the likelihood of galvanic corrosion, either the bearings 55, caging member 54, or connective rod throw 35 may be coated with an insulating substance such as a synthetic resin or the like. Such coating may be applied in a single layer or multiple layers and may be formed on any or all of the noted elements, i.e., bearing rollers 55, caging member 54, and connecting rod throw 35. Because of this construction, the engine can operate on a long life and corrosion resistance will be ensured.

It should be understood that the foregoing description is that of a preferred embodiment of the engine and that various changes and modifications may be made without departing from the spirit and scope of the invention, as defined by the appended claims.

What is claimed is:

1. A connecting rod bearing arrangement comprising a metallic connecting rod having a big end, a metallic crankshaft throw passing through said big end, and a metallic bearing interposed between said crankshaft throw and said connecting rod big end, at least a portion of the metallic surface of one of said connecting rod big end, said crankshaft throw and said bearing being coated with an electrical insulating substance.

2. A connecting rod bearing arrangement as set forth in claim 1 wherein the bearing comprises a caging member holding a plurality of roller bearing members in spaced relationship.

3. A connecting rod bearing arrangement as set forth in claim 2 wherein the caging member is formed from a metal having an electrical potential no higher than that of the bearing members.

4. A connecting rod bearing arrangement for a connecting rod having a big end, a crankshaft throw passing through said big end, and a bearing interposed between said crankshaft throw and said connecting rod big end, said bearing comprises a caging member holding a plurality of roller bearings in spaced relationship, said caging member being formed from a metal having an electrical potential no higher than that of the bearing members.

* * * * *